United States Patent Office
3,420,813
Patented Jan. 7, 1969

1

3,420,813
MONAZO DYESTUFFS CONTAINING 4-HYDROXY-6-METHYL AND 6-HYDROXY - 4 - METHYL-PYRAZOLO[3,4-b]PYRIDINE GROUPS
Curt Mueller, Basel, Basel-Stadt, and Otto Senn, Arlesheim, Basel-Land, Switzerland, assignors to Sandoz Ltd. (a/k/a Sandoz A.G.), Basel, Switzerland
No Drawing. Continuation-in-part of application Ser. No. 429,908, Feb. 2, 1965. This application May 25, 1967, Ser. No. 641,110
Claims priority, application Switzerland, Feb. 6, 1964, 1,417/64
U.S. Cl. 260—156    13 Claims
Int. Cl. C09b 29/08

---

ABSTRACT OF THE DISCLOSURE 4-hydroxy-6-methyl- and 6-hydroxy-4-methyl-pyrazolo[3,4-b]pyridines are particularly useful coupling components in the preparation of azo dyestuffs. The resulting azo dyes produce dyeings on linear aromatic polyester and cellulose ester fibers which have excellent fastness properties.

---

This application is a continuation-in-part of application Ser. No. 429,908 filed Feb. 2, 1965, now abandoned.

Azo dyes

Dyes of the general formula

D—N=N—K wherein D stands for the radical of an aromatic or heterocyclic diazo component and K for the radical of the pyrazolo-pyridine series.

In Chemical and Pharmaceutical Bulletin, vol. 10, No. 7, (1962), p. 616 (Y. Makisumi), and in "Berichte der Deutschen Chemischen Gessellschaft" 43, vol. III, (1910), pp. 3401–3412 (C. Bülow) is described the production of 4-hydroxypyrazolo-[3,4-b]-pyridines by condensation of an aminopyrazole and acetoacetic ester derivatives in glacial acetic acid at 115° C. Recently it was discovered that the result of condensation of aminopyrazole and acetoacetic ester in boiling "Dowtherm" is a hydroxy-pyrazolo-pyridine, isomer to that obtained according to the C. Bülow process. The search however shows that the constitution of the two isomers cannot be considered as certain, that means it is not clear which of the two possible formulas belongs to the compound obtained by the Bülow process and which belongs to the other process. The products so obtained are very useful as coupling compounds for the production of excellent azo dyestuffs. The dyestuffs are of the formula

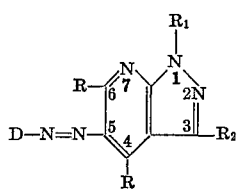

(I)

2 wherein one of the substituents R represents a hydroxy group and the other R represents a methyl, ethyl or a phenyl group,
$R_1$ represents a hydrocarbon radical which may be substituted by chlorine, bromine, cyano, amino, hydroxy, methyl, ethyl, methoxy, ethoxy, acetylamino, aminosulfonyl, methylsulfonyl or acetoxy, or a chlorophenyl-furfuryl radical,
$R_2$ represents a hydrogen atom, a methyl, methoxy or phenyl group and
D represents a phenyl radical which may be substituted, a naphthyl radical which may be substituted by nitro or acetyl, a thiazolyl radical which may be substituted by nitro or cyano, a thienyl radical which may be substituted by nitro or acetyl, a benzothiazolyl radical which may be substituted by methylsulfonyl or methoxy, a thiadiazolyl radical which may be substituted by nitro, an indazolyl radical or a benzotriazolyl radical.

The valency bond to the azo group comes from a carbon atom of the nucleus of one of the mentioned radicals.

In particular the dyestuffs correspond to the formulas

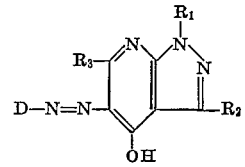

(II)

and

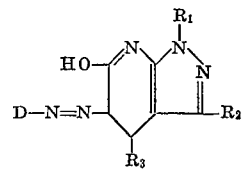

(III)

wherein D has the meanings given above,
$R_1$ represents a phenyl radical which may be substituted by chlorine, bromine, cyano, amino, hydroxy, methyl, ethyl, methoxy, ethoxy, acetylamino, aminosulfonyl or methylsulfonyl, an alkyl radical having 1–4 carbon atoms which may be substituted by chlorine, bromine, cyano, hydroxy, phenyl or acetoxy, a cyclohexyl radical or a chlorophenyl-furfuryl radical,
$R_2$ represents a hydrogen atom, a methyl, methoxy or phenyl group and
$R_3$ represents a methyl, ethyl or phenyl group.

If D represents a phenyl radical this may be substituted by all substituents usually employed in the chemistry of dyestuffs, in particular: a chlorine or bromine atom, a cyano, nitro, methyl, methoxy, trifluoromethyl, formyl, acetyl, acetoxy, methoxycarbonyl, ethoxycarbonyl, methylsulfonyl, phenylsulfonyl, methylaminosulfonyl, dimethylaminosulfonyl, aminocarbonyl, methylaminocarbonyl, dimethylaminocarbonyl, methylaminosulfonylamino, dimethylaminosulfonylamino, phenylmethoxycarbonyl, nitrophenylazo, aminophenylazo, acetylaminophenylazo or methylsulfonylphenylazo.

The new dyes are produced by diazotising an amine of formula $$D-NH_2 \quad (IV)$$

and coupling the resulting compound with a pyrazolopyridine of formula

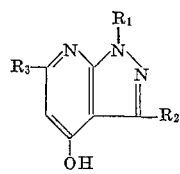

(V)

or

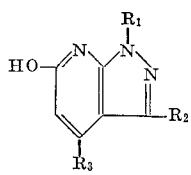

(VI)

The coupling reaction is carried out preferably in neutral to weakly alkaline medium. The dyes formed, which are poorly soluble or virtually insoluble in water, can be converted into dye preparations by grinding in the presence of wetting or dispersing agents as required. On dispersion in water these preparations are used for the dyeing, padding or printing of shaped materials, e.g., filaments, fibers, and woven or knitted textiles, of semisynthetic or fully synthetic, hydrophobic, high-molecular organic substances.

Textiles of linear aromatic polyester fibers, e.g. polyethylene terephthalate, and cellulose esters, notably secondary cellulose acetate and cellulose triacetate, are dyed in yellow, orange or yellowish red shades. The dyeings have excellent fastness to light, thermofixation, pleating, sublimation, dry cleaning, cross dyeing, chlorine and gas fumes, and very good wet fastness properties, such as water, washing and perspiration fastness. They are not subject to catalytic fading. Textiles of synthetic polyamide fibers and polymerisation products consisting predominantly of acrylonitrile can also be dyed in fast shades with the new dyes. Cotton, viscose and wool are well reserved.

The new dyes can also be used as pigments when they are free from carboxyl and sulfonic acid groups, e.g. for the mass coloration of dissolved or undissolved plastics and of natural or synthetic resins.

The parts and percentages in the examples are by weight and the temperatures in degrees centigrade.

The coupling compounds employed in Examples 1 to 139 were produced according to the Y. Makisumi or C. Bülow process, it is presumed that their formulas are as indicated in the examples.

Example 1

A solution of 6.9 parts of sodium nitrite in 30 parts of water is gradually added in 30 minutes at 0–3° to a mixture of 16.5 parts of 4-aminobenzoic acid ethyl ester, 40 parts of 30% hydrochloric acid and 120 parts of ice-water. After 1 hour the excess nitrite is destroyed with aminosulfonic acid. The diazonium salt formed is added to a solution of 22.5 parts of 4-hydroxy-6-methyl-1-phenyl-pyrazolo-[3,4-b]-pyridine in 200 parts of water containing 6 parts of sodium hydroxide and 20 parts of sodium carbonate. When the coupling reaction has run its course the product is filtered off, washed with water until free of alkali, and dried. After recrystallisation from dimethyl formamide and glacial acetic acid, a compound is obtained which melts at 196° and dyes polyester fibers in yellow shades.

Example 2

The diazonium salt obtained according to the particulars given in Example 1 is added to a solution of 23.9 parts of 3,6-dimethyl-4-hydroxy-1-phenyl-pyrazolo-[3,4-b]-pyridine in 400 parts of water containing 30 parts of sodium hydroxide and 100 parts of sodium bicarbonate. On completion of coupling 180 parts of concentrated hydrochloric acid are added dropwise. The dye formed is filtered off, washed with water until free of acid and dried. On recrystallization from dioxan it melts at 214°. It dyes polyester fibers in greenish yellow shades having excellent fastness properties.

Example 3

A solution of 6.9 parts of sodium nitrite in 30 parts of water is added to a mixture of 13.8 parts of 1-amino-3-nitrobenzene, 40 parts of 30% hydrochloric acid and 120 parts of ice-water in the course of 30 minutes at 0–3°. After 1 hour the excess nitrite is destroyed with aminosulfonic acid. The diazonium salt obtained is added to a solution of 23.9 parts of 3,6-dimethyl-4-hydroxy-1-phenyl-pyrazolo-[3,4-b]-pyridine in 400 parts of water containing 30 parts of sodium hydroxide and 100 parts of bicarbonate. On completion of the coupling reaction 180 parts of concentrated hydrochloric acid are added dropwise. The dye formed is filtered off, washed with water until free of acid, and dried. After recrystallization from dioxan the pure dye melts at 240°. It dyes polyester fibers in greenish yellow shades with very good fastness properties.

Example 4

A solution of 6.9 parts of sodium nitrite in 30 parts of water is added in 30 minutes at 0–3° to a mixture of 16.2 parts of 1-amino-2,5-dichlorobenzene, 40 parts of concentrated hydrochloric acid and 150 parts of ice-water. After 1 hour the excess nitrite is destroyed with aminosulfonic acid. The diazonium salt formed is added to a solution of 23.9 parts of 3,6-dimethyl-4-hydroxy-1-phenyl-pyrazolo-[3,4-b]-pyridine in 400 parts of water containing 30 parts of sodium hydroxide and 100 parts of sodium bicarbonate. During the coupling reaction the temperature is maintained between 0° and 5° by the addition of 400 parts of ice. On completion of coupling 180 parts of concentrated hydrochloric acid are added dropwise, after which the dye is filtered off, washed with water until free of acid and dried. On recrystallization from a mixture of chlorobenzene and dimethyl formamide in the ratio 1:6, the pure dye melts at 256°. It dyes polyester fibers in reddish yellow shades.

Example 5

In 15 minutes at 0–3° a solution of 6.9 parts of sodium nitrite in 30 parts of water is added to a mixture of 12.7 parts of 1-amino-4-chlorobenzene, 40 parts of 30% hydrochloric acid and 150 parts of ice-water. After a further 15 minutes the excess nitrite is destroyed with aminosulfonic acid. The diazonium salt formed is added to a mixture of 23.9 parts of 3,6-dimethyl-4-hydroxy-1-phenyl-pyrazolo-[3,4-b]-pyridine, 30 parts of sodium hydroxide, 100 parts of sodium bicarbonate, 300 parts of ice and 400 parts of water. On completion of the coupling reaction 180 parts of concentrated hydrochloric acid are added dropwise, after which the dye is filtered off, washed with water till free of acid and dried. On recrystallization from dioxan the pure dye melts at 246°. It dyes polyester fibers in yellow shades.

Further dyes of Formula II which are obtainable by procedures analogous to the above are tabulated below.

TABLE 1

| Ex. No. | D | $R_1$ | $R_2$ | $R_3$ | Shade on Polyester Fiber |
|---|---|---|---|---|---|
| 6 | 2-chlorophenyl | phenyl | $CH_3$ | $CH_3$ | Yellow. |
| 7 | 2-chloro-4-nitrophenyl | 3-chlorophenyl | H | $CH_3$ | Reddish yellow. |
| 8 | 2-nitro-4-bromophenyl | 4-acetylaminophenyl | H | $CH_3$ | Do. |
| 9 | 2-cyan-4-nitrophenyl | 3-cyanphenyl | H | $CH_3$ | Do. |
| 10 | 2-methylsulfonylphenyl | phenyl | $CH_3$ | $CH_3$ | Yellow. |
| 11 | 2,6-dibromo-4-methylsulfonylphenyl | phenyl | $CH_3$ | $CH_3$ | Orange. |
| 12 | 2,4-dicyanphenyl | ethyl | $CH_3$ | $CH_3$ | Yellow. |
| 13 | 2-cyan-5-chlorophenyl | ethyl | H | $CH_3$ | Do. |
| 14 | 4-dimethylaminosulfonylphenyl | β-cyanethyl | H | $CH_3$ | Do. |
| 15 | 4-methylsulfonylnaphthyl | β-hydroxyethyl | H | $CH_3$ | Do. |
| 16 | 6-methylsulfonylbenzothiazolyl-2 | β-chloroethyl | H | $CH_3$ | Do. |
| 17 | 5-nitrothiadiazolyl-2- | methyl | H | $CH_3$ | Do. |
| 18 | 5-nitrothiazolyl-2 | phenyl | $CH_3$ | $CH_3$ | Orange. |
| 19 | 5-cyanthiazolyl-2 | phenyl | H | $CH_3$ | Do. |
| 20 | 3-nitro-5-acetylthienyl-2 | phenyl | H | $CH_3$ | Do. |
| 21 | 4-chloro-5-nitrophenyl | phenyl | $CH_3$ | $CH_3$ | Yellow. |
| 22 | 2-nitrophenyl | isopropyl | $CH_3$ | $CH_3$ | Greenish yellow. |
| 23 | 2,4-dicyanphenyl | β-hydroxyethyl | $CH_3$ | $CH_3$ | Yellow. |
| 24 | 2-cyan-5-chlorophenyl | β-cyanethyl | $CH_3$ | $CH_3$ | Do. |
| 25 | 4-chloro-5-nitrophenyl | β-phenylethyl | $CH_3$ | $CH_3$ | Do. |
| 26 | 2-methylsulfonylphenyl | cyclohexyl | $CH_3$ | $CH_3$ | Do. |
| 27 | 3-nitrophenyl | isobutyl | $CH_3$ | $CH_3$ | Greenish yellow. |
| 28 | 4-dimethylaminosulfonylphenyl | phenylmethyl | $CH_3$ | $CH_3$ | Yellow. |
| 29 | 4-ethoxycarbonylphenyl | 4-aminophenyl | $CH_3$ | $CH_3$ | Greenish Yellow. |
| 30 | 2-chloro-4-dimethylaminocarbonylphenyl | 4-methylphenyl | $CH_3$ | $CH_3$ | Yellow. |
| 31 | 3-methylaminosulfonylphenyl | 4-acetylaminophenyl | $CH_3$ | $CH_3$ | Do. |
| 32 | 2-chloro-4-methylsulfonylphenyl | 2,4-dimethylphenyl | $CH_3$ | $CH_3$ | Do. |
| 33 | 3-methylaminosulfonylphenyl | 2-methoxyphenyl | $CH_3$ | $CH_3$ | Do. |
| 34 | 4-ethoxycarbonylphenyl | 4-ethoxyphenyl | $CH_3$ | $CH_3$ | Do. |
| 35 | 4-chlorophenyl | 2-methylphenyl | $CH_3$ | $CH_3$ | Do. |
| 36 | 4-methoxycarbonylphenyl | 2,6-dimethylphenyl | $CH_3$ | $CH_3$ | Do. |
| 37 | 3-nitrophenyl | β-hydroxy-β-phenylethyl | $CH_3$ | $CH_3$ | Do. |
| 38 | 4-acetoxyphenyl | phenyl | $CH_3$ | $CH_3$ | Do. |
| 39 | 4-ethoxycarbonylphenyl | phenyl |  | $CH_3$ | Do. |
| 40 | 3-nitrophenyl | methyl |  | $CH_3$ | Do. |
| 41 | 4-methoxycarbonylpheny | phenyl | —$OCH_3$ | $CH_3$ | Do. |
| 42 | 4-nitrophenyl | phenyl | $CH_3$ | $CH_3$ | Do. |
| 43 | 2,6-dichloro-4-nitrophenyl | phenyl | $CH_3$ | $CH_3$ | Do. |
| 44 | 2-nitro-4-phenylsulfonylphenyl | phenyl | $CH_3$ | $CH_3$ | Do. |
| 45 |  | phenyl | $CH_3$ | $CH_3$ | Do. |
| 46 | 2,5-dimethoxy-4-nitrophenyl | phenyl | $CH_3$ | $CH_3$ | Do. |
| 47 | 2-nitro-4-trifluoromethylphenyl | phenyl | $CH_3$ | $CH_3$ | Do. |
| 48 | 2,5-dichlorophenyl | phenyl | $CH_3$ | $CH_2$ | Do. |
| 49 | 4-methylsulfonylphenyl | phenyl | $CH_3$ | $CH_3$ | Do. |
| 50 | 2,4-dinitronaphthyl-1 | phenyl | $CH_3$ | $CH_3$ | Do. |
| 51 | 1,6-dinitronaphthyl-2- | phenyl | $CH_3$ | $CH_3$ | Reddish yellow. |
| 52 | benzotriazolyl-4- | phenyl | $CH_3$ | $CH_3$ | Yellow. |
| 53 | 6-methoxybenzothiazolyl-2- | phenyl | $CH_3$ | $CH_3$ | Do. |
| 54 | indazolyl-3- | phenyl | $CH_3$ | $CH_3$ | Do. |
| 55 | 3-nitrophenyl | 3-aminosulfonylphenyl | $CH_3$ | $CH_3$ | Do. |
| 56 | 3-nitrophenyl | 3-methylsulfonylaminophenyl | $CH_3$ | $CH_3$ | Do. |
| 57 | 3-nitrophenyl | 3-chlorophenylfurfuryl-2- | $CH_3$ | $CH_3$ | Do. |
| 58 |  | phenyl | $CH_3$ | $CH_3$ | Orange. |
| 59 |  | phenyl | $CH_3$ | $CH_3$ | Do. |
| 60 |  | phenyl | $CH_3$ | $CH_3$ | Do. |
| 61 |  | phenyl | $CH_3$ | $CH_3$ | Do. |

| Ex. No. | D | R₁ | R₂ | | Shade on Polyester Fiber |
|---|---|---|---|---|---|
| 62 | ⬡-N=N-⬡- (NO₂, CH₃ substituents) | phenyl | CH₃ | CH₃ | Orange |
| 63 | 3-nitrophenyl | β-acetoxyethyl | CH₃ | CH₃ | Yellow. |
| 64 | 3-nitrophenyl | phenyl | CH₃ | phenyl | Do. |
| 65 | 2,4-bis-(methylsulfonyl)-phenyl | phenyl | CH₃ | CH₃ | Do. |
| 66 | 2-methylsulfamido-4-methylsulfonylphenyl | phenyl | CH₃ | CH₃ | Do. |
| 67 | 2-dimethylaminosulfonylaminophenyl | phenyl | CH₃ | CH₃ | Do. |
| 68 | 2-nitrophenyl | phenyl | CH₃ | CH₃ | Do. |
| 69 | 2-cyanphenyl | phenyl | H | CH₃ | Do. |
| 70 | 2-cyanphenyl | methyl | CH₃ | CH₃ | Do. |
| 71 | 2-cyanphenyl | methyl | H | CH₃ | Do. |
| 72 | 2-cyanphenyl | phenyl | CH₃ | CH₃ | Do. |
| 73 | 2-cyanphenyl | phenyl | H | CH₃ | Do. |
| 74 | 2-cyanphenyl | methyl | -⬡ | CH₃ | Do. |
| 75 | 3-cyanphenyl | methyl | -⬡ | CH₃ | Do. |
| 76 | 3-cyanphenyl | methyl | CH₂CH₃ | CH₃ | Do. |
| 77 | 3-cyanphenyl | methyl | CH₃ | CH₃ | Do. |
| 78 | 3-cyanphenyl | 4-ethoxyphenyl | -⬡ | CH₃ | Do. |
| 79 | 3-cyanphenyl | phenyl | CH₃ | CH₃ | Do. |
| 80 | 3-cyanphenyl | phenyl | H | CH₃ | Do. |
| 81 | 3-chlorophenyl | phenyl | H | CH₃ | Do. |
| 82 | 3-chlorophenyl | phenyl | CH₃ | CH₃ | Do. |
| 83 | 3-chlorophenyl | methyl | CH₃ | CH₃ | Do. |
| 84 | 3-chlorophenyl | methyl | H | CH₃ | Do. |
| 85 | 3-chlorophenyl | methyl | -⬡ | CH₃ | Do. |
| 86 | 2-cyan-5-chlorophenyl | methyl | H | CH₃ | Do. |
| 87 | 2-cyan-5-chlorophenyl | methyl | CH₃ | CH₃ | Do. |
| 88 | 2-cyan-5-chlorophenyl | phenyl | CH₃ | CH₃ | Do. |
| 89 | 2-cyan-5-chlorophenyl | phenyl | H | CH₃ | Do. |
| 90 | 3,4-dichlorophenyl | phenyl | H | CH₃ | Do. |
| 91 | 3,4-dichlorophenyl | phenyl | CH₃ | CH₃ | Do. |
| 92 | 3,4-dichlorophenyl | methyl | CH₃ | CH₃ | Do. |
| 93 | 3,4-dichlorophenyl | methyl | -⬡ | CH₃ | Do. |
| 94 | 2-chloro-5-nitrophenyl | methyl | -⬡ | CH₃ | Do. |
| 95 | 2-chloro-5-nitrophenyl | methyl | CH₃ | CH₃ | Do. |
| 96 | 2-chloro-5-nitrophenyl | methyl | H | CH₃ | Do. |
| 97 | 2-chloro-5-nitrophenyl | phenyl | H | CH₃ | Do. |
| 98 | 2-chloro-5-nitrophenyl | phenyl | CH₃ | CH₃ | Do. |
| 99 | ⬡-CH₂-O-CO-⬡- | phenyl | CH₃ | CH₃ | Do. |
| 100 | ⬡-CH₂-O-CO-⬡- | phenyl | H | CH₃ | Do. |
| 101 | 3-nitrophenyl | phenyl | CH₃ | CH₂CH₃ | Do. |
| 102 | 4-ethoxycarbonylphenyl | phenyl | CH₃ | CH₂CH₃ | Do. |
| 103 | 4-methoxycarbonylphenyl | phenyl | CH₃ | CH₂CH₃ | Do. |
| 104 | 4-methoxycarbonylphenyl | methyl | CH₃ | CH₂CH₃ | Do. |
| 105 | 3-nitrophenyl | methyl | CH₃ | CH₂CH₃ | Do. |
| 106 | 3-cyanphenyl | methyl | CH₃ | CH₂CH₃ | Do. |
| 107 | 3-cyanphenyl | phenyl | CH₃ | CH₂CH₃ | Do. |
| 108 | 3-cyanphenyl | methyl | -⬡ | CH₂CH₃ | Do. |
| 109 | 3-chlorophenyl | methyl | CH₃ | CH₂CH₃ | Do. |
| 110 | 3-chlorophenyl | methyl | H | CH₂CH₃ | Do. |
| 111 | 3-chlorophenyl | phenyl | H | CH₂CH₃ | Do. |
| 112 | 3-chlorophenyl | phenyl | CH₃ | CH₂CH₃ | Do. |
| 113 | 2-chlorophenyl | phenyl | CH₃ | CH₂CH₃ | Do. |
| 114 | 2-chloro-5-nitrophenyl | phenyl | CH₃ | CH₂CH₃ | Do. |
| 115 | 2-chloro-5-nitrophenyl | phenyl | H | CH₂CH₃ | Do. |
| 116 | 2-chloro-5-nitrophenyl | methyl | CH₃ | CH₂CH₃ | Do. |
| 117 | 3-cyanphenyl | β-hydroxyethyl | CH₃ | CH₂CH₃ | Do. |
| 118 | 2-cyan-5-chlorophenyl | 3-chlorophenyl | CH₃ | CH₂CH₃ | Do. |
| 119 | 4-methoxyphenyl | phenyl | CH₃ | CH₂ | Do. |
| 120 | 4-methylphenyl | phenyl | CH₃ | CH₂ | Do. |
| 121 | 3-nitro-4-methylphenyl | phenyl | CH₃ | CH₂ | Do. |
| 122 | 3-nitro-4-methoxyphenyl | phenyl | CH₃ | CH₂ | Do. |
| 123 | 4-formylphenyl | phenyl | CH₃ | CH₂ | Do. |
| 124 | 2-methyl-4-chlorophenyl | phenyl | CH₃ | CH₂ | Do. |
| 125 | 4-bromophenyl | phenyl | CH₃ | CH₂ | Do. |
| 126 | 3-bromophenyl | phenyl | CH₃ | CH₂ | Do. |

| Ex. No. | D | R₁ | R₂ | R₃ | Shade on Polyester Fiber |
|---|---|---|---|---|---|
| 127 | 3-chloro-4-methylphenyl | phenyl | $CH_3$ | $CH_2$ | Yellow. |
| 128 | 3-trifluoromethylphenyl | phenyl | $CH_3$ | $CH_2$ | Do. |
| 129 | 4-aminocarbonylphenyl | phenyl | $CH_3$ | $CH_2$ | Do. |
| 130 | 3-methylphenyl | phenyl | $CH_3$ | $CH_2$ | Do. |
| 131 | 2-methylphenyl | phenyl | $CH_3$ | $CH_2$ | Do. |
| 132 | 4-methylphenyl | phenyl | H | $CH_2$ | Do. |
| 133 | 2,5-dimethoxyphenyl | phenyl | $CH_3$ | $CH_2$ | Do. |
| 134 | 2-methoxyphenyl | phenyl | $CH_3$ | $CH_2$ | Do. |
| 135 | 2-methoxy-4-methylphenyl | phenyl | $CH_3$ | $CH_2$ | Do. |
| 136 | 2,5-dimethylphenyl | phenyl | $CH_3$ | $CH_2$ | Do. |
| 137 | 2,4,6-trimethylphenyl | phenyl | $CH_3$ | $CH_2$ | Do. |
| 138 | 2,6-dimethylphenyl | phenyl | $CH_3$ | $CH_2$ | Do. |

Example 139

18.8 parts of 1-amino-2-hydroxybenzene-5-sulfonic acid amide are diazotized with 100 parts of 1-normal sodium nitrite solution at 0–5° in 200 parts of 10% hydrochloric acid. The diazonium salt thus obtained is added to a mixture of 21.3 parts of 3,6-dimethyl-4-hydroxy-1-phenyl-pyrazolo-[3,4-b]-pyridine, 200 parts of water and 50 parts of sodium carbonate. The coupling reaction is brought to an end in weakly alkaline medium, the dye filtered off and washed free of alkali.

The following examples were performed with coupling components obtained according to the newly discovered process, the formula of the coupling compounds is presumed to be a 6-hydroxy-pyrazolo-[3,4-b]-pyridine.

Example 140

A solution of 6.9 parts of sodium nitrite in 30 parts of water is gradually added in 30 minutes at 0–3° to a mixture of 16.5 parts of 4-aminobenzoic acid ethyl ester 40 parts of 30% hydrochloric acid and 120 parts of ice-water. After 1 hour the excess nitrite is destroyed with aminosulfonic acid. The diazonium salt formed is added to a solution of 22.5 parts of 3,4-dimethyl-6-hydroxyl-1-phenyl-pyrazolo-[3,4-b]-pyridine in 200 parts of water containing 6 parts of sodium hydroxide and 20 parts of sodium carbonate. When the coupling reaction has run its course the product is filtered off, washed with water until free of alkali, and dried.

perature increased to 95–100° in about 30 minutes and the fabric dyed for 1 hour at this temperature. It is then removed from the bath, rinsed, soaped at 70° with a 0.1% solution of an alkylphenyl polyglycol ether, rinsed again and dried. A yellow dyeing with good fastness properties is obtained.

Equally good dyeings are obtained without carrier when dyeing is carried out in a high temperature dyeing machine at 120–130°.

The most representative dyestuffs produced according to the details given in the examples are the following (probable formulas):

Example 1

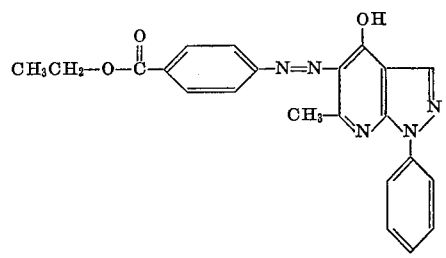

TABLE 2

| Ex. No. | D | R₁ | R₂ | R₃ | Shade on Polyester Fiber |
|---|---|---|---|---|---|
| 141 | 3-nitro-4-methoxyphenyl | phenyl | methyl | methyl | Reddish yellow. |
| 142 | 4-methoxyphenyl | phenyl | methyl | methyl | Do. |
| 143 | 4-methylphenyl | phenyl | methyl | methyl | Do. |
| 144 | 3-nitro-4-methylphenyl | phenyl | methyl | methyl | Do. |
| 145 | 4-formylphenyl | phenyl | methyl | methyl | Do. |
| 146 | 2-methyl-4-chlorophenyl | phenyl | methyl | methyl | Do. |
| 147 | 4-bromophenyl | phenyl | methyl | methyl | Do. |
| 148 | 3-bromophenyl | phenyl | methyl | methyl | Do. |
| 149 | 3-chloro-4-methylphenyl | phenyl | methyl | methyl | Do. |
| 150 | 3-trifluoromethylphenyl | phenyl | methyl | methyl | Do. |
| 151 | 4-aminocarbonylphenyl | phenyl | methyl | methyl | Do. |
| 152 | 3-nitrophenyl | phenyl | methyl | methyl | Do. |
| 153 | 4-chlorophenyl | phenyl | methyl | methyl | Do. |
| 154 | 3-cyanophenyl | phenyl | methyl | methyl | Do. |
| 155 | 3-chlorophenyl | phenyl | methyl | methyl | Do. |
| 156 | 3,4-dichlorophenyl | phenyl | methyl | methyl | Do. |

Dyeing method

Seven parts of the dye obtained in accordance with Example 1 are ground for 48 hours in a ball mill with 4 parts of sodium dinaphthyl methane disulfonate, 4 parts of sodium cetyl sulfate and 5 parts of anhydrous sodium sulfate until a fine powder is obtained. 2 parts of the powder are dispersed in 3000 parts of water containing 3 parts of a 30% solution of a highly sulfonated castor oil and 20 parts of an emulsion of a chlorinated benzene as carrier. 100 parts of "Dacron" (registered trademark) polyester fiber fabric are entered into the bath at 20–25°, the tem-

Example 2

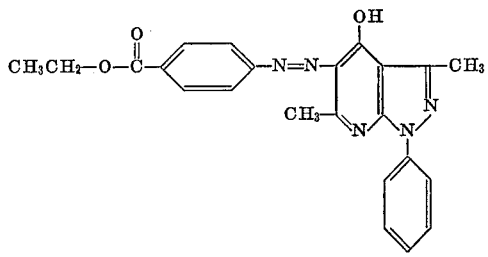

Example 3

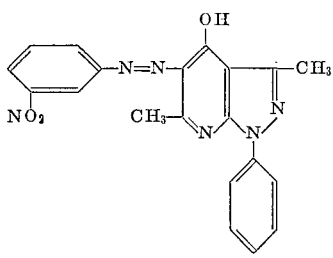

Example 4

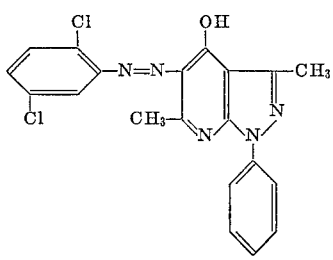

Example 5

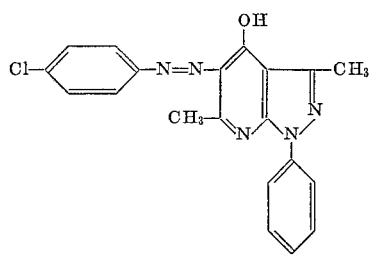

Having thus disclosed the invention what we claim is:
1. A dye of the formula

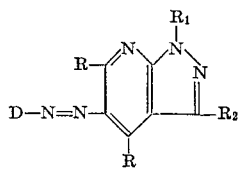

wherein one of the substituents R represents a hydroxy group and the other R represents a methyl, ethyl or a phenyl group, $R_1$ represents a hydrocarbon radical which may be substituted by chlorine, bromine, cyano, amino, hydroxy, methyl, ethyl, methoxy, ethoxy, acetylamino, aminosulfonyl methylsulfonyl or acetoxy, or a chlorophenyl-furfuryl radical, $R_2$ represents a hydrogen atom, a methyl, methoxy or phenyl group and D represents a phenyl radical substituted by at least one member selected from the group consisting of a hydrogen atom, chloro, bromo, cyano, nitro, methyl, methoxy, trifluoromethyl, formyl, acetyl, acetoxy, methoxycarbonyl, ethoxycarbonyl, methylsulfonyl, phenylsulfonyl, methylaminosulfonyl, dimethylaminosulfonyl, aminocarbonyl, methylaminocarbonyl, dimethylaminocarbonyl, methylaminosulfonylamino, dimethylaminosulfonylamino, phenylmethoxycarbonyl, nitrophenylazo, aminophenylazo, acetylaminophenylazo and methylsulfonylphenylazo; a naphthyl radical substituted by at least one member selected from the group consisting of a hydrogen atom, nitro and acetyl; a thiazolyl radical substituted by at least one member selected from the group consisting of a hydrogen atom, nitro and cyano; a thienyl radical substituted by at least one member selected from the group consisting of a hydrogen atom, nitro and acetyl; a benzothiazolyl radical substituted by at least one member selected from the group consisting of a hydrogen atom, methylsulfonyl and methoxy; a thiadiazolyl radical substituted by at least one member selected from the group consisting of a hydrogen atom and nitro; an indazolyl radical; or a benzotriazolyl radical; the valency bond to the azo group being from a carbon atom of the nucleus of one of said radicals.

2. A dye according to claim 1 of the formula

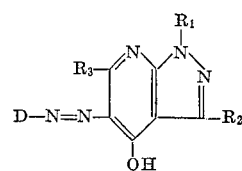

(II)

wherein $R_1$ represents a phenyl radical which may be substituted by chlorine, bromine, cyano, amino, hydroxy, methyl, ethyl, methoxy, ethoxy, acetylamino, aminosulfonyl or methylsulfonyl, an alkyl radical having 1–4 carbon atoms which may be substituted by chlorine, bromine, cyano, hydroxy, phenyl or acetoxy, a cyclohexyl radical or a chlorophenyl-furfuryl radical, $R_2$ represents a hydrogen atom, a methyl, methoxy or phenyl group and $R_3$ represents a methyl, ethyl or phenyl group.

3. A dye according to claim 1 of the formula

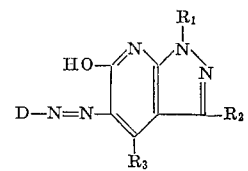

(III)

wherein $R_1$ represents a phenyl radical which may be substituted by chlorine, bromine, cyano, amino, hydroxy, methyl, ethyl, methoxy, ethoxy, acetylamino, aminosulfonyl or methylsulfonyl, an alkyl radical having 1–4 carbon atoms which may be substituted by chlorine, bromine, cyano, hydroxy, phenyl or acetoxy, a cyclohexyl radical or a chlorophenyl-furfuryl radical, $R_2$ represents a hydrogen atom, a methyl, methoxy or phenyl group and $R_3$ represents a methyl, ethyl or phenyl group.

4. The dye according to claim 1 of the formula

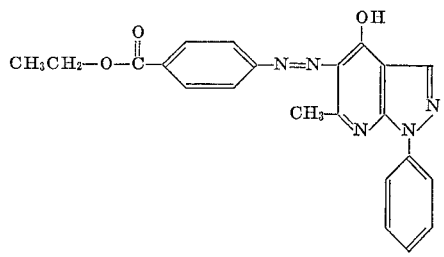

5. The dye according to claim 1 of the formula

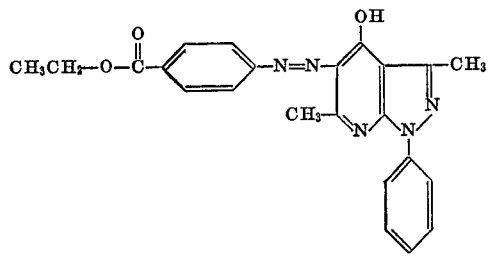

6. The dye according to claim 1 of the formula

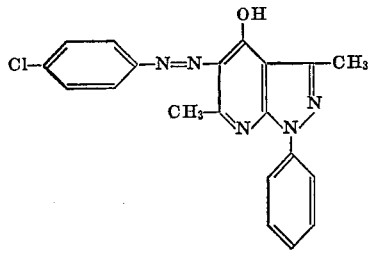

7. The dye according to claim 1 of the formula

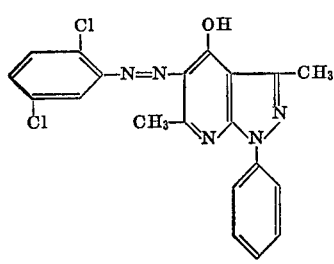

8. The dye according to claim 1 of the formula

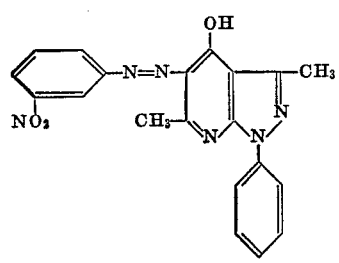

9. The dye according to claim 1 of the formula

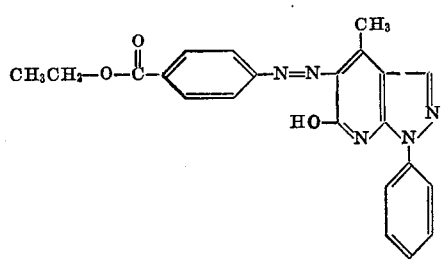

10. The dye according to claim 1 of the formula

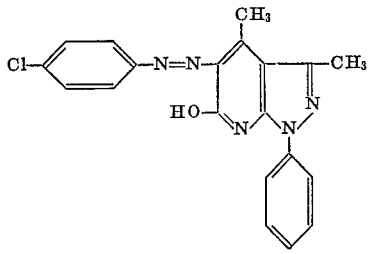

11. The dye according to claim 1 of the formula

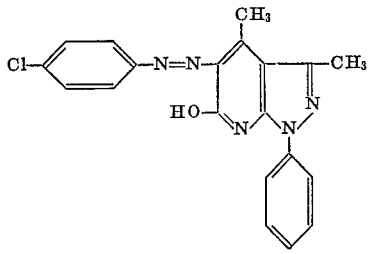

12. The dye according to claim 1 of the formula

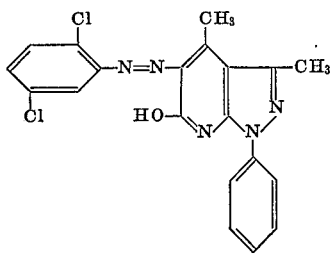

13. The dye according to claim 1 of the formula

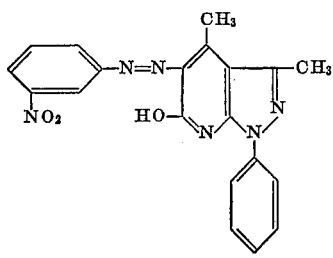

References Cited

UNITED STATES PATENTS 2,953,571   9/1960   Schulze _____ 260—296 XR

OTHER REFERENCES

Makisumi, C. A., vol. 60, p. 531 e, f (1964).
Reid et al.: C. A., vol. 56, pp. 13051–13052 (1962).
Reid et al.: C. A., vol. 58, pp. 9075–9076 (1963).

FLOYD D. HIGEL, *Primary Examiner.*

U.S. Cl. X.R.

8—41, 50, 71; 117—138.8; 260—294.8, 294.9, 295, 296, 297